April 29, 1952 E. G. SEIBERT 2,594,813
AUTOMOBILE WINDOW SUNVISOR SHADE
Filed April 23, 1949
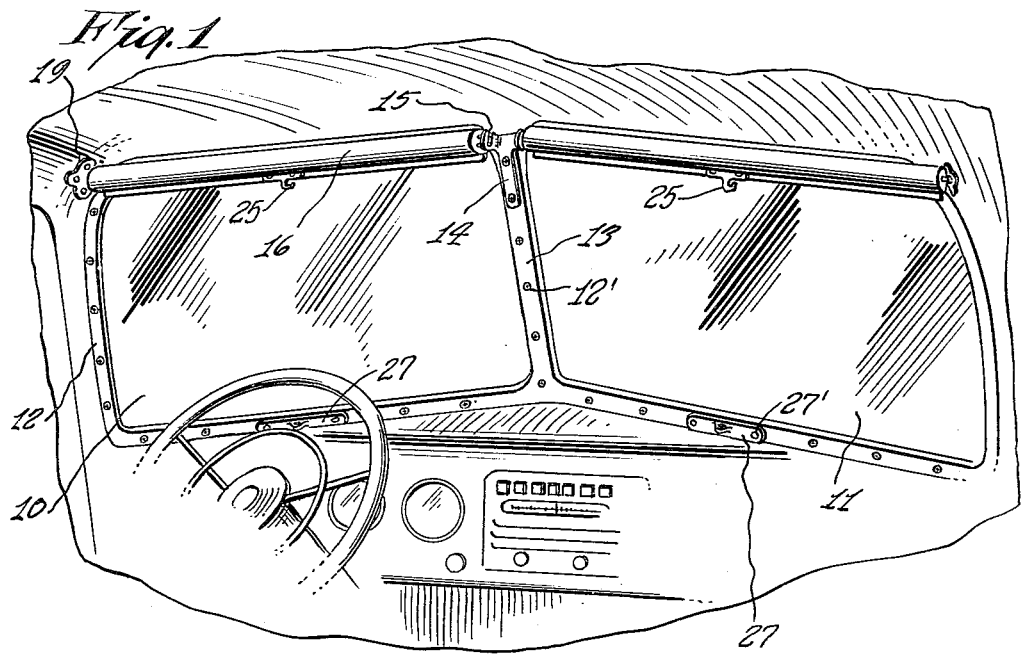
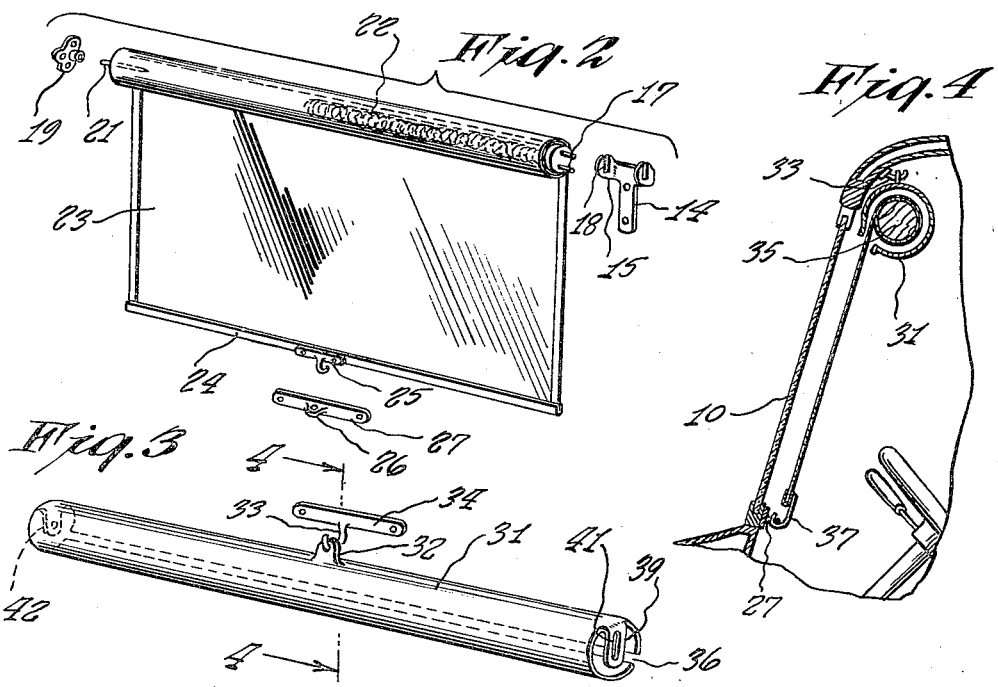
INVENTOR
EDWARD G. SEIBERT
BY
Carl Miller
ATTORNEY Patented Apr. 29, 1952

2,594,813

UNITED STATES PATENT OFFICE 2,594,813

AUTOMOBILE WINDOW SUNVISOR SHADE

Edward G. Seibert, Scarsdale, N. Y.

Application April 23, 1949, Serial No. 89,360

1 Claim. (Cl. 160—120)

This invention relates to an automobile sun visor shade.

It is an object of the present invention to provide a sun visor shade which can be easily connected to the upper part of the window or windshield and which can be drawn and connected at the lower part of the window to stretch before the operator of the car or others a transparent plastic shield which will absorb some of the glare of the sun upon advancing the car in a direction facing the sun and wherein upon the release of the lower end of the curtain from the lower part of the window, the curtain will be automatically raised to an out-of-the-way position.

Other objects of the present invention are to provide an automobile window sun visor shade which is of simple construction, easy to install upon the automobile, compact, easy to adjust, and efficient in operation.

For other objects and for a better understanding of the invention, reference may be had to the following detailed description taken in connection with the accompanying drawing, in which:

Fig. 1 is a perspective view looking upon the inside of a windshield with curtains embodying the features of the present invention mounted above the windshield.

Fig. 2 is a collective view of one of the curtains and the parts for retaining the same within the windshield opening.

Fig. 3 is a perspective view of a modified form of curtain embodying a sleeve out of which the curtain can be drawn and wherein the attachment can be made with the upper part of the window by a single hook.

Fig. 4 is a vertical sectional view taken generally on line 4—4 of Fig. 3, but with the curtain extended and drawn downwardly to the lower edge of the window of the automobile.

Referring now to the figures, 10 and 11 represent windshield windows having the usual frames 12 surrounding them respectively and a center frame portion 13 to which a double bracket 14 is fixed and which has hanger slotted portions 15 to which the inner ends of curtains 16 are fastened. Prongs 17 extend into slots 18 of the bracket slotted portion 15. At the opposite sides of the windows are brackets 19 adapted to receive pin projections 21 respectively on the ends of the curtain. Within the curtain is a spring 22 tending to return the curtain when released and the curtain itself is formed of plastic transparent material 23 adapted to absorb some of the glare of the sun. On the bottom edge of the curtain is a stiffened piece 24 having a hook bracket 25 thereon adapted to engage with a projection 26 of a bracket 27 which is mounted at the lower part of the windshield frame. Accordingly, when there is a glare on the road, the curtain can be pulled and the view will be had through the transparent curtain material. Upon release of the hook bracket 25, the curtain will automatically be reeled upon its central member and elevated out of the way.

It will be noted that the frame 12 for the windshield had a plurality of holes 12' for receiving the securing screws which fit the frame into the vehicle body and secures the windshield elements 10 and 11 therewithin. These screw holes 12' are equally spaced around the frame 12 and throughout the inner portion 13. The double bracket 14 has holes corresponding to the holes 12' of the center portion so that the screws of the frame can pass through the bracket 14 and the same screw holes of the frame. The screws which may be used for securing the bracket 14 may be longer or a replacement of the other screws. Similarly, the hook brackets 27 have hole spacings, as indicated at 27', which are spaced to be aligned with the holes of the bottom of the frame 12 so that the screws can pass through the bracket holes 27' and the holes 12' of the frame 12. This makes it possible to install the sun shades on the standard frames for the windshields and without the need for drilling holes in metal.

Referring now particularly to Figs. 3 and 4, there is shown a modified form of the invention wherein a sleeve 31 serves as the support for the curtain. This sleeve has a projection 32 with an opening therein adapted to receive a hook formation 33 of a bracket 34 which is fixed to the automobile top. This shield 31 will protect the curtain at all times and tend to keep it clean. A curtain 35 is disposed within the shield upon its rod and can be drawn through a slot 36 to a lowered position where its hook 37 can be fastened to bracket 27 at the lower part of the window frame. The sleeve has a projection 39 at one end having a slot 41 for receiving the two prongs 17 of the curtain and a projection 42 at the opposite end of the sleeve for receiving the pin projection 21 of the curtain.

While various changes may be made in the detail construction, it shall be understood that such changes shall be within the spirit and scope of the present invention as defined by the appended claim.

Having thus set forth and disclosed the nature of my invention, what is claimed is:

In an automobile having an automobile body portion, windshield elements and a frame securing the windshield elements to the body portion, said frame having a center portion, said frame including the center portion having spaced screwhole openings adapted to receive fastening screws, curtain rolls of transparent material respectively mounted on rollers and disposable over the respective windshield elements to cover, when extended, both the left and right windshield elements which are separated by the center portion, a common bracket element having screw openings therein alineable to match with the screw openings of the center portion of the frame whereby the frame and bracket may be secured to the center portion by common screws passing through the openings of the frame center portion, other bracket elements respectively connected to the opposite sides of the automobile body, said respective rollers having pins in one end adapted to engage with the brackets at the opposite sides of the body, said curtain rollers further having double prongs, said common center portion bracket having slots therein for receiving the prongs of the curtain rollers, each of said curtain rollers having a return spring connected with the associated prongs, whereby upon insertion of the prongs into the associated slots of the center portion bracket, the spring is anchored, each of said curtain rolls having hook fasteners thereon, said frame portion having fastening pieces adapted to receive the respective hooks, said fastener pieces having hole spacings similar to the hole spacings of the frame and adapted to be secured to the frame by the screws of the frame, said fastener pieces being adapted to receive the hook members of the respective curtain rolls and to hold the curtain rolls when extended downwardly over the windshield elements.

EDWARD G. SEIBERT.

REFERENCES CITED

The following references are of record in the file of this patent:

UNITED STATES PATENTS

| Number | Name | Date |
|---|---|---|
| 1,380,894 | Gerhard | June 7, 1921 |
| 1,526,346 | Kivikink | Feb. 17, 1925 |
| 1,813,881 | Peters | July 7, 1931 |
| 1,814,293 | Christie | July 14, 1931 |
| 1,913,961 | Shape | June 13, 1933 |